United States Patent
Perry et al.

(10) Patent No.: US 7,752,353 B2
(45) Date of Patent: Jul. 6, 2010

(54) SIGNALING AN INTERRUPT REQUEST THROUGH DAISY CHAINED DEVICES

(75) Inventors: Nir Perry, Holon (IL); Asher Druck, Nahariya (IL)

(73) Assignee: SanDisk IL Ltd., Kfar Saba (IL)

( * ) Notice: Subject to any disclaimer, the term of this patent is extended or adjusted under 35 U.S.C. 154(b) by 68 days.

(21) Appl. No.: 11/928,110

(22) Filed: Oct. 30, 2007

(65) Prior Publication Data

US 2009/0106469 A1 Apr. 23, 2009

Related U.S. Application Data

(60) Provisional application No. 60/981,772, filed on Oct. 22, 2007.

(51) Int. Cl.
*G06F 3/00* (2006.01)

(52) U.S. Cl. .................. 710/48; 710/47; 710/268

(58) Field of Classification Search ............ 710/48–50, 710/260–263, 266, 268, 269
See application file for complete search history.

(56) References Cited

U.S. PATENT DOCUMENTS

| | | | | |
|---|---|---|---|---|
| 5,274,800 | A * | 12/1993 | Babb et al. | 714/32 |
| 5,745,787 | A * | 4/1998 | Martschin et al. | 710/17 |
| 5,819,112 | A * | 10/1998 | Kusters | 710/36 |
| 6,070,221 | A * | 5/2000 | Nakamura | 710/264 |
| 6,098,144 | A * | 8/2000 | De Oliveira et al. | 710/269 |
| 6,260,100 | B1 * | 7/2001 | Kessler | 710/260 |
| 6,629,179 | B1 * | 9/2003 | Bashford | 710/260 |
| 6,918,001 | B2 * | 7/2005 | Fanning | 710/316 |
| 6,983,337 | B2 * | 1/2006 | Diamant | 710/48 |
| 7,136,956 | B2 * | 11/2006 | Furuya et al. | 710/316 |
| 2004/0199694 | A1 * | 10/2004 | Yiu et al. | 710/264 |
| 2007/0283067 | A1 * | 12/2007 | Patella | 710/260 |

FOREIGN PATENT DOCUMENTS

| | | |
|---|---|---|
| EP | 0 355 856 | 2/1990 |
| WO | WO98/12634 | 3/1998 |

OTHER PUBLICATIONS

International Search Report dated Mar. 10, 2009 in PCT Application No. PCT/US08/80537.
Written Opinion dated Mar. 10, 2009 in PCT Application No. PCT/US08/80537.
Database Inspec [Online] The Institution of Electrical Engineers, Stevenage, GB; Nov. 1982, Kurtz H L et al.: "Multilevel, single-line, serial priority poll featuring poll-in, poll-out and poll capture" % IBM Technical Disclosure Bulletin USA vol. 25, No. 6, Nov. 1982, pp. 3037-3041.

* cited by examiner

*Primary Examiner*—Khanh Dang
(74) *Attorney, Agent, or Firm*—Beyer Law Group LLP

(57) ABSTRACT

A system and a method for asynchronously signaling interrupts from a plurality of devices in a computing system, while optimizing the latencies in handling the interrupts. In a particular embodiment, an interrupt is signaled via a plurality of daisy chained devices by handing over the interrupt request from one device to another while retaining information regarding any interrupts handed over (also referred to as passed). In this way, the interrupt source can be readily identified (using a binary search, for example) thereby reducing interrupt latency and memory resources required to retain interrupt history.

19 Claims, 6 Drawing Sheets

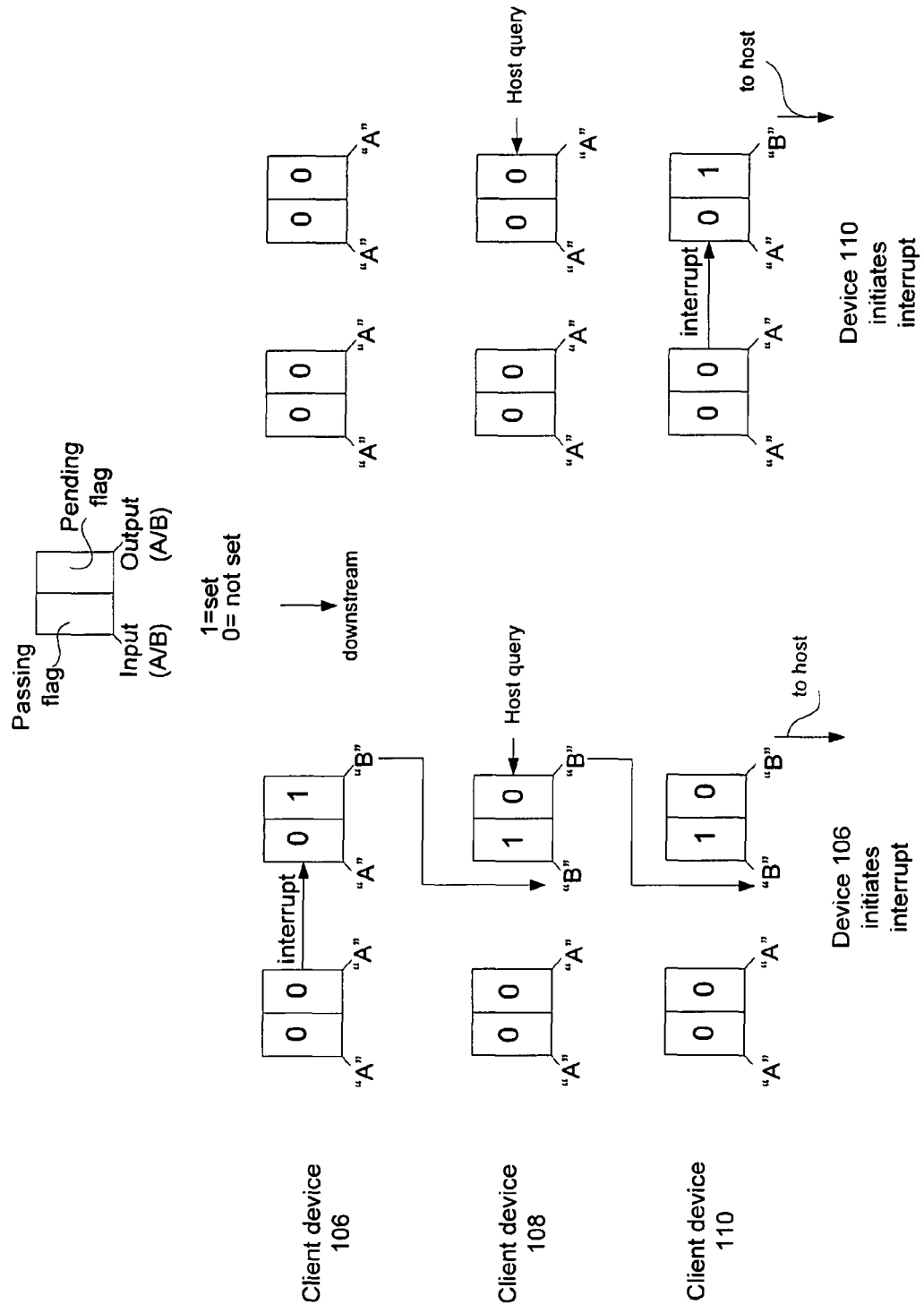

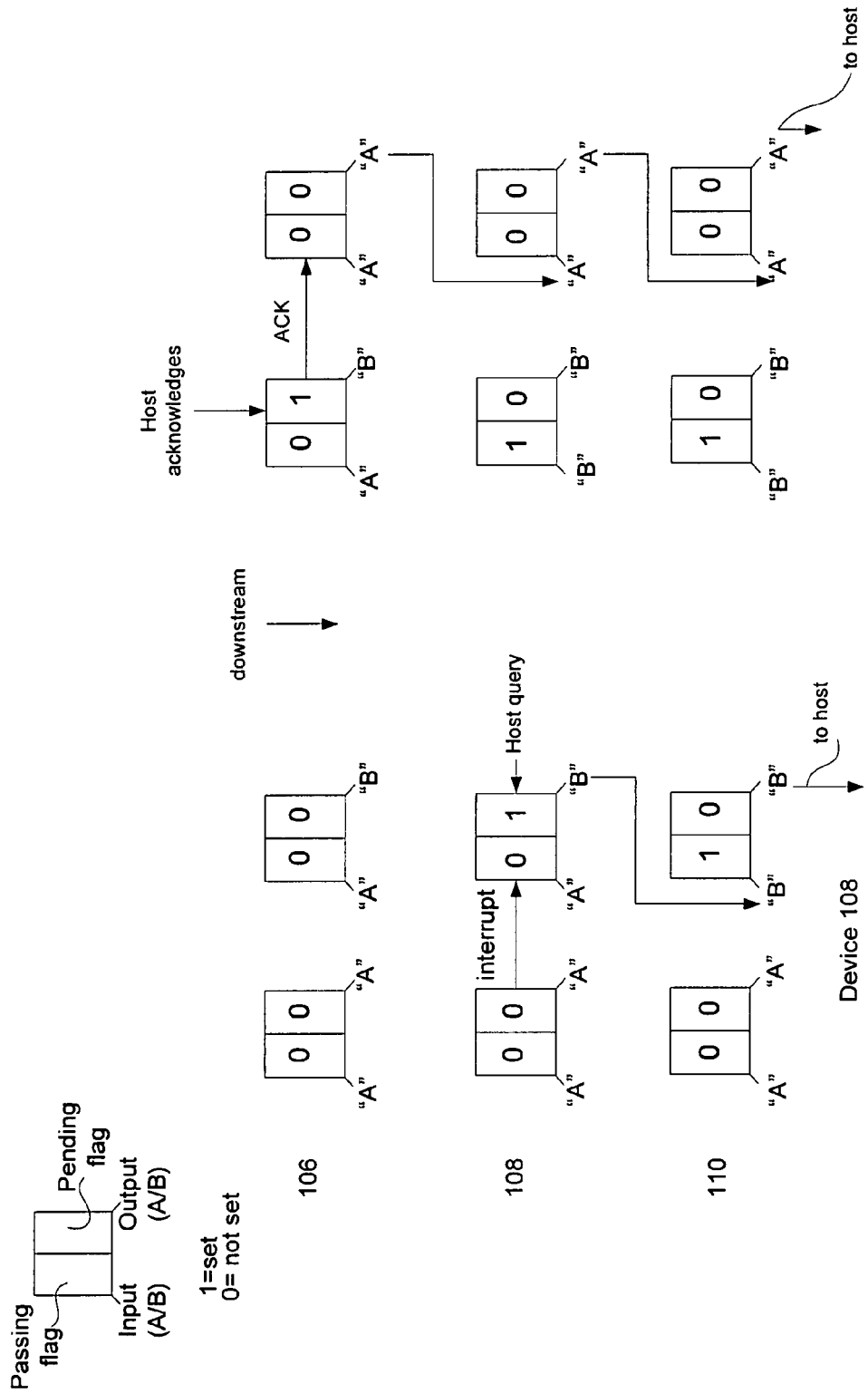

SIGNALING AN INTERRUPT REQUEST THROUGH DAISY CHAINED DEVICES

CROSS REFERENCE TO RELATED APPLICATIONS

This patent application takes priority under 35 U.S.C. 119 (e) from U.S. Provisional Patent Application Ser. No. 60/981,772 entitled, "Signaling an Interrupt Request Through Daisy Chained Devices", by Perry et al. filed Oct. 22, 2007 which is also incorporated by reference in its entirety for all purposes.

FIELD OF THE INVENTION

The present invention relates generally to digital devices. More particularly, the present invention relates to signaling interrupts.

BACKGROUND

It has become commonplace to connect a host computer to a flexible number of various functional devices (such as storage devices, communications devices, sensing devices, and the like that can be either removable or fixed in nature) using a plurality of conducting wires referred to as a "bus" that typically complies with well known standards. In most situations, the number of conducting wires included in the bus is not the same as the number of devices connected and therefore the number of conducting wires that constitute the bus are shared amongst any and all of the devices connected to the bus. Since all the devices share the same conducting wires within the bus and in order for the host computer to communicate with each of the devices, each device is both assigned a unique address and subsequently programmed to respond only to messages that are addressed to that unique address. In this way, multiple devices can share the same conducting wires that form the bus resulting in a substantially reduced bus size than would be otherwise be required.

Many I/O devices have an interrupt request line to signal the host they need attention. This is often used to notify the host new data is available or that a previous calculation has completed. Occasionally, each device has a separate interrupt request line to the host, so that the host can differentiate between the various sources. In this case, the host is required to have multiple interrupt request lines, which means higher cost of hardware. Occasionally, several devices share an interrupt request line to the host such that when an interrupt is signaled the host must query each device if it is the interrupt source. In this scenario, the host is required to do a search on every interrupt event which is inefficient and time consuming and increasing the latency of servicing an interrupt by the host computer resulting in more resources from the host to remember interrupt history for a longer period of time.

Therefore, it is desired to support interrupt signals from many devices without adding cost relatively to the number of devices as well as minimizing the latency associated with servicing the interrupts.

SUMMARY OF THE DESCRIBED EMBODIMENTS

According to different embodiments of the present invention, various methods, devices and systems are described for efficiently servicing interrupt requests in a system having a number of client devices sharing a bus. One embodiment describes a bus architecture that includes at least one signal line and a plurality of client devices. Each of the plurality of client devices includes a number of I/O pins selected ones of which are connected to the at least one signal line, and a first and a second interrupt pin wherein all but a first and a last of the plurality of client devices are connected to one another in a daisy chain arrangement by way of the first and the second interrupt pin separate from the at least one signal line. The first client device is connected to the daisy chain arrangement only by way of the second interrupt pin and the first interrupt pin of the first device is connected to a node external to the daisy chain The last client device is connected to the daisy chain only by way of a first interrupt pin and a second interrupt pin of the last of the plurality of client devices is connected to an external circuit by way of an interrupt signal line separate from the at least one signal line. In one aspect of the invention, the external circuit is a host computer.

A method of signaling an interrupt request through a plurality of daisy-chained client devices connected by way of a first and a second interrupt pin and I/O pins selected ones of which are connected to at least one signal line wherein a last one of the client devices communicates with a host computer independently of the at least one signal line. The method is carried out by requesting an interrupt by at least one of the daisy chained client devices, passing the interrupt request downstream from the requesting client device through the daisy chain to the last client device bypassing the at least one signal line, communicating the interrupt request to the host computer by the last client device, identifying the requesting client device by the host computer, and servicing the requesting client device by the host computer.

An apparatus for signaling an interrupt request through a plurality of daisy-chained client devices connected by way of a first and a second interrupt pin and I/O pins selected ones of which are connected to at least one signal line wherein a last one of the client devices communicates with a host computer independently of the at least one signal line. The apparatus includes means for requesting an interrupt by at least one of the daisy chained client devices, means for passing the interrupt request downstream from the requesting client device through the daisy chain to the last client device bypassing the at least one signal line, means for communicating the interrupt request to the host computer by the last client device, means for identifying the requesting client device by the host computer, and means for servicing the requesting client device by the host computer.

A system includes a host device, at least one signal line connected to the host device, and a plurality of client devices. Each of the client devices includes a number of I/O pins selected ones of which are connected to the at least one signal line, and a first and a second interrupt pin. All but a first and a last of the plurality of client devices are connected to one another in a daisy chain arrangement by way of the first and the second interrupt pin separate from the at least one signal line. The first client device is connected to the daisy chain arrangement only by way of the second interrupt pin and the first interrupt pin of the first device is connected to a node external to the daisy chain. The last client device is connected to the daisy chain only by way of a first interrupt pin and a second interrupt pin of the last of the plurality of client devices is connected to the host computer by way of an interrupt signal line separate from the at least one signal line.

A bus architecture that includes a plurality of independent signal lines, and a plurality of client devices having a number of I/O pins and a first and a second interrupt pin. All but a first and a last of the plurality of client devices are connected to one another in a daisy chain arrangement by way of the first and the second interrupt pin separate from the plurality of signal lines. The first client device is connected to the daisy chain arrangement only by way of the second interrupt pin and the first interrupt pin of the first device is connected to a node external to the daisy chain. The last client device is connected to the daisy chain only by way of a first interrupt pin and a second interrupt pin of the last of the plurality of client devices is connected to an external circuit by way of an interrupt signal line separate from the plurality of independent signal lines.

DETAILED DESCRIPTION OF THE DRAWINGS

FIG. 1 shows a simplified wiring diagram of a system according to the present invention.

FIGS. 2A-2D showing a simplified example of signaling of an interrupt throughout the system shown in FIG. 1.

DETAILED DESCRIPTION OF THE DESCRIBED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

The present invention teaches a system and a method for asynchronously signaling interrupts from a plurality of devices in a computing system, while optimizing the latencies in handling the interrupts. In a particular embodiment, an interrupt is signaled via a plurality of daisy chained devices by handing over the interrupt request from one device to another while retaining information regarding any interrupts handed over (also referred to as passed). In this way, the interrupt source can be readily identified using any number of searching schemes (a binary search, for example) thereby reducing interrupt latency and memory resources required to retain interrupt history.

Embodiments of the invention are discussed below with reference to FIGS. 1-5. However, those skilled in the art will readily appreciate that the detailed description given herein with respect to these figures is for explanatory purposes as the invention extends beyond these limited embodiments. It should be noted that even though in the context of this discussion, the first and second pins are referred to as first and second interrupt pins operable to pass interrupt information, the first and second pins can in some embodiments operate as first and second interrupt pin used to facilitate passing of initialization information in those situations where the associated client device must undergo initialization along the lines described in co-pending U.S. patent application Ser. No. 11/927,108, filed Oct. 29, 2007 and entitled "Addressing Multiple Devices on a Shared Bus" by Zatelman et al. which is incorporated by reference for all purposes.

Figure 1:
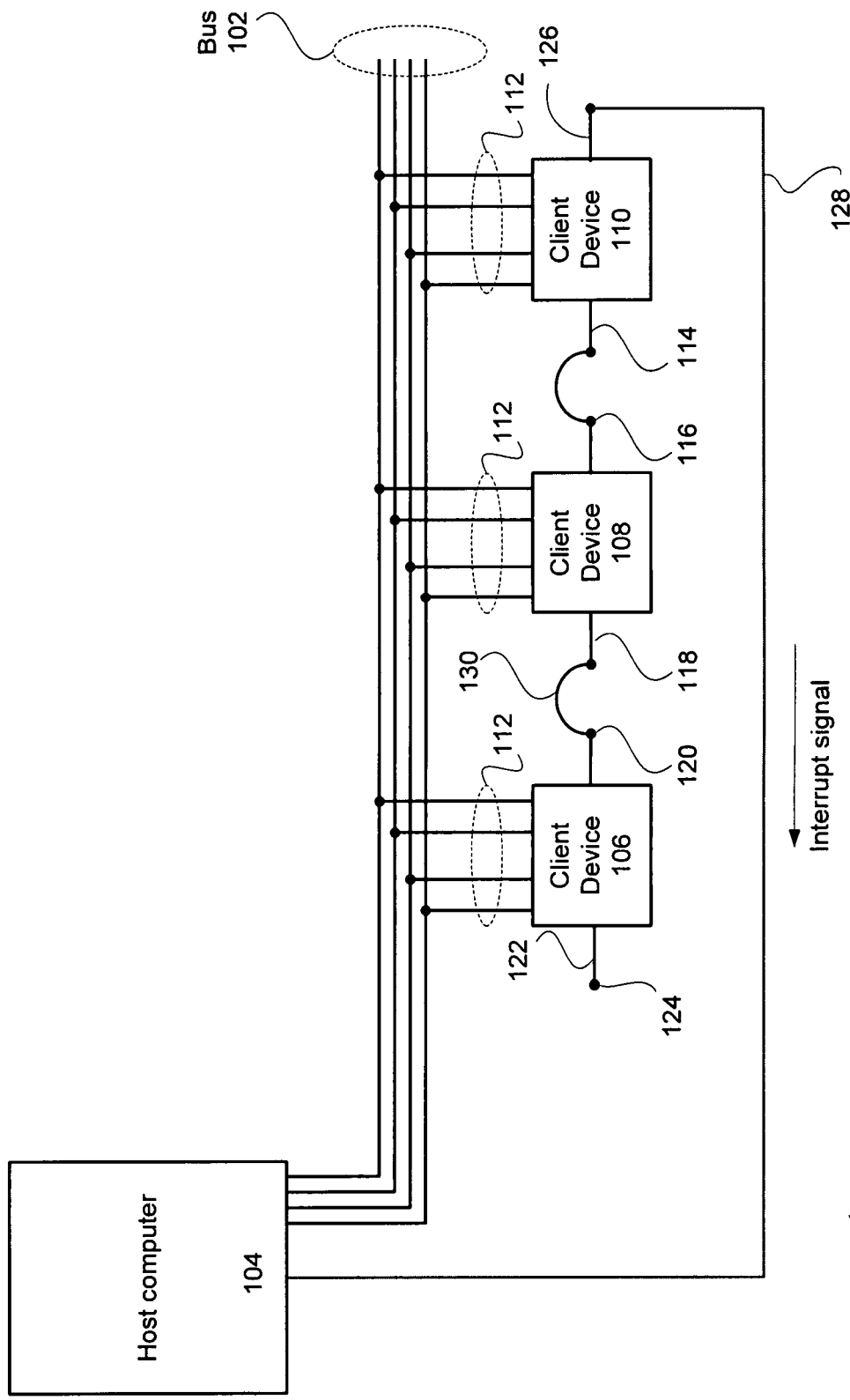

FIG. 1 shows a simplified wiring diagram of a system 100 according to the present invention. The system 100 includes a number of signal lines 102 (referred to as bus 102) used to connect a host computer 104 to a plurality of client devices 106, 108, and 110. It should be noted that even though only three client devices (106, 108 and 110) are shown, it can be appreciated that there can be any number of client devices in system 100. Each of the client devices includes a number of I/O pins 112 selected ones of which are used to electrically connect an associated one of the client devices to bus 102. In addition to I/O pins 112, each client device includes at least two interrupt pins that can be used to pass interrupt information from one client device to another as well as signify an interrupt status of an associated client device. In the described embodiment, first and second interrupt pins can be used to connect client devices 106, 108 and 110 in a daisy chain arrangement separate from bus 102. By daisy chain arrangement, it is meant that a first (input) pin of one client device is electrically connected to a second (output) pin of a neighboring client device. The connection can be either by hard soldering, by a printed circuit layout or by connection of socket pins. For example, first interrupt pin 114 of client device 110 can be connected to second interrupt pin 116 of client device 108 and first interrupt pin 118 of client device 108 can be connected to second interrupt pin 120 of client device 106. Unlike the other client devices, however, first interrupt pin 122 of client device 106 can be connected to an external node 124 and interrupt pin 126 (referred to a host monitor pin 126) of client device 110 can be connected to host computer 104 via wire 128 that can be separate from bus 102. It is by monitoring activity on interrupt pin 126 by way of wire 128, that host computer 104 can sense a change in interrupt status by at least one of the client devices 106, 108, or 110.

It should also be noted that each client device is capable of setting an associated pending interrupt flag and a passed interrupt flag. In the described embodiment, the fact that a client device is an interrupt source can be recorded by setting associated pending interrupt flag (from NOT_SET to SET, for example). On the other hand, if a client device has received notification (by way of first interrupt pin in communication with second interrupt pin of a neighboring device) that at least one "upstream" client device is an interrupt source, then this fact can be recorded by the receiving client device by setting its passed interrupt flag (from NOT_SET to SET, for example). By upstream it is meant those client devices between a particular client device and the first client device which in this case is client device 106. It should be noted that once the host computer 104 has identified and acknowledged a pending interrupt, the pending interrupt flag of the interrupt source will change from SET to NOT_SET which will, in turn, be communicated "down" the daisy chain by way of the first and second interrupt pins of the those client devices upstream (i.e., those client devices between the last client device (i.e., client device 110 in this case) and the interrupt source).

Reference is now made to FIGS. 2A-2C showing a simplified example of signaling of an interrupt throughout the system 100. All client devices having been initialized and start in their respective initial states where no interrupt is pending by any of the client devices and all have their respective interrupt pins (both first and second) set to logic level A. In this example, client device 106 signals an interrupt by changing the logic level on second interrupt pin from logic level A to logic level B and setting its pending interrupt flag to SET from NOT_SET. Since interrupt pin of client device 106 is electrically connected to the first interrupt pin 118 of client device 108, first interrupt pin 118 also changes from logic level A to logic level B. Client device 108 senses this change and in response, changes second interrupt pin 116 to logic level B from logic level A thereby passing interrupt information forward, or downstream, through the daisy chain to client device 110 since first interrupt pin 114 of client device 110 is connected to second interrupt pin 116 of client device 108. In response to the sensed change at first interrupt pin 114, client device 110 changes second interrupt pin 126 from logic level A to logic level B. In this way, information regarding the interrupt at client device 106 is passed down the daisy chain. Since second interrupt pin 126 of client device 110 is connected by way of wire 128 to host computer 104, the change in status of interrupt pin 126 is monitored by host computer 104 that, in turn, concludes that an interrupt event has occurred at least one of the client devices 106-110. At this point host computer 104 starts to search for and identify the interrupt source using, for example, a binary search.

In order to identify the interrupt source, host asks 104 queries client device 108 for its device status to which client device 108 responds by reporting that interrupt pin 118 is logic level B and that its pending interrupt flag is NOT_SET (indicating that it has no pending interrupts). Interrupt pin 116 will be set to logic level B if either client device 108 has a pending interrupt or an interrupt flag has been passed from a previous client device(s). In this way, host computer 104 can deduce that client device 108 is not the interrupt source (its pending interrupt flag is NOT_SET) and that the interrupt event signal was passed from at least client device 106. Since client device 106 is the known first device in the daisy chain, host computer 104 can conclude that the interrupt event signal originated at client device 106 and the search is over (as evidence by the interrupt pending flag being SET for client device 106). However, if as shown in FIG. 2B, client device 108 had reported that both the pending and passing interrupt flags are NOT_SET, indicating that no interrupt has been initiated and no interrupt has passed through it (both interrupt pins are set at logic level A and pending and passing interrupt flags are NOT_SET), then host computer 104 could deduce that client device 110 has a pending interrupt and is therefore the interrupt source. Furthermore, had, as shown in FIG. 2C, client device 108 reported that it has a pending interrupt and no interrupt has passed through it, then host computer 104 could deduce that client device 108 has a pending interrupt and is therefore the interrupt source. It should be noted that had a device reported both it has a pending interrupt and it has its first interrupt pin set to logic level B, then host computer 104 could deduce that the client device is an interrupt source, but not the only interrupt source indicating that host computer 104 would have to continue the search in order to identify the other interrupt sources.

As shown in FIG. 2D, after host computer 104 handles the interrupt called by client device 106, host computer 104 acknowledges client device 106 that its interrupt was serviced and in response, client device 106 passes this information downstream by changing the state of second interrupt pin 120 from logic level B to logic level A. This change in state is sensed by client device 108 and responds by changing the status of second interrupt pin to logic level A as well (since it has no pending interrupts of its own). Further downstream, client device 110 senses the change in first interrupt pin 114 and responds by changing the status of interrupt pin 126 to logic level A. Host computer 104 senses the change at interrupt pin 126 by way of wire 128 and deduces that there are no current pending interrupts in system 100.

Figure 3:
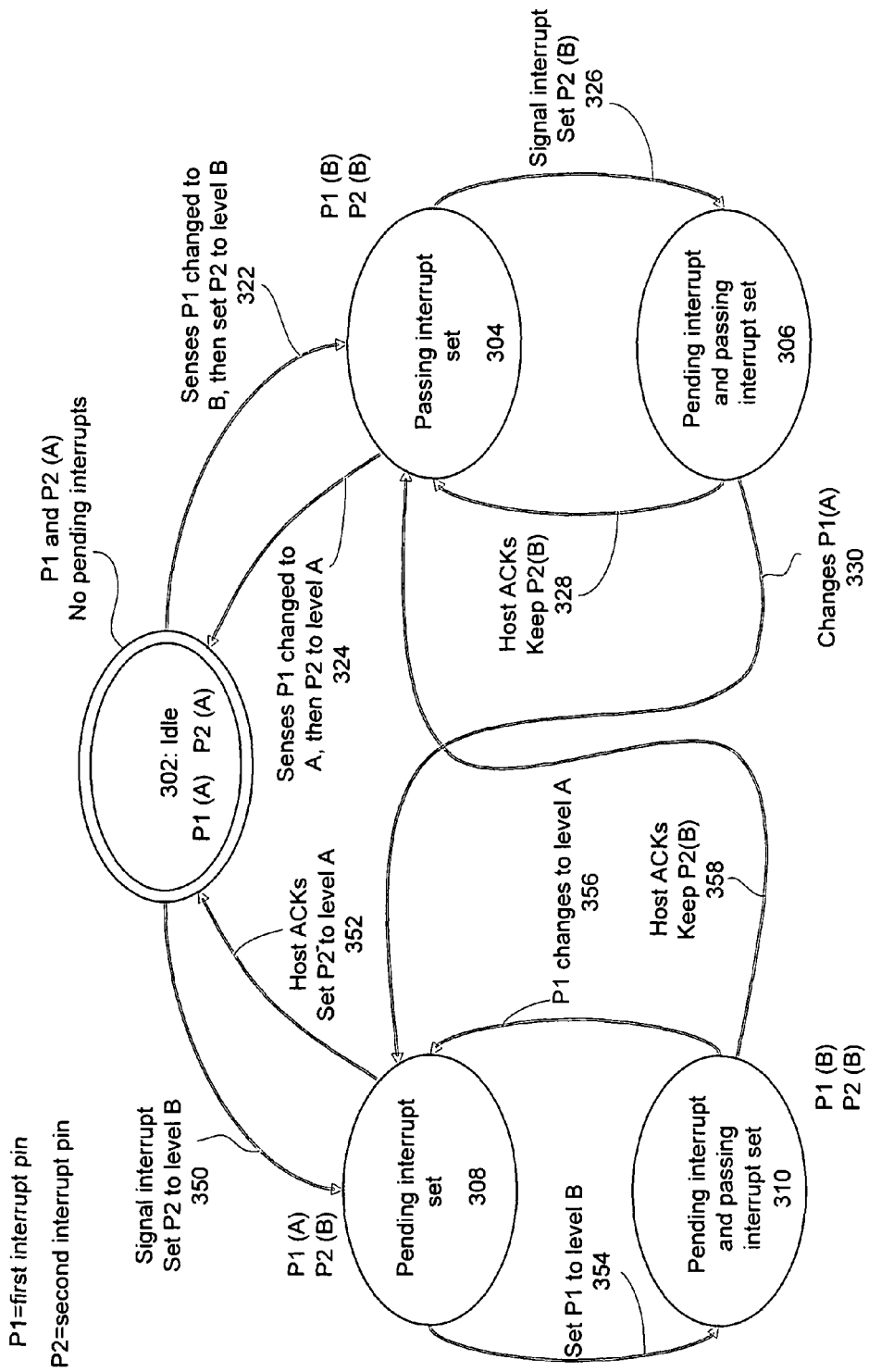
FIG. 3 shows a simplified state machine 300 representative of client device of system shown in FIG. 1.

FIG. 3 shows a simplified state machine 300 representative of client device 108 of system 100 of the present invention. Following initialization of client devices 106-110, client device 108 enters initial state 302 where both pending and passing interrupt flags are NOT_SET (i.e., there is no indication of a pending interrupt by client device 108 and client device 108 has no recording of any interrupt event that has passed from any downstream client devices (in this case client device 106). In this state, both its first and second interrupt pins are at logic level A. If client device 108 signals an interrupt 350, it changes second interrupt pin from logic level A to logic level B enters state 308 where the interrupt pending flag is SET. If following state 308, first interrupt pin changes to logic level B at 354, client device 108 keeps second interrupt pin at logic level B and enters state 310 where both the interrupt pending and passing flags are SET. If, however, while in state 310 first interrupt pin changes back to logic level A at 356, client device 108 returns to state 308 but keeps second interrupt pin at logic level B. If while in state 308 host computer 104 acknowledges 352 the pending interrupt, client device 108 returns to state 302 and changes second interrupt pin to logic level A. If while in state 310 host computer 104 acknowledges 358 the interrupt then client device 108 enters state 304 and maintains the second interrupt pin at logic level B.

While still in the initial state 302, if client device 108 senses that first interrupt pin has changed from logic level A to logic level B at 322, then client device 108 responds by changing second interrupt pin to logic level B and enters state 304 where the passing event indicator is set. From this state, if client device 108 senses that first interrupt pin changes back to logic level A at 324, it too changes back its second interrupt pin to logic level A and moves back to state 302. If from state 304, however, client device 108 needs to signal an interrupt 326, it keeps its second interrupt pin at logic level B and enters state 306 where both pending and passing interrupt flags are set. If while in state 306 host computer 104 acknowledges the interrupt at 328, then device 108 enters state 304 and keeps second interrupt pin at logic level B. If while in state 306 the first interrupt pin changes back to logic level A at 330, client device 108 device enters state 308 but keeps the second interrupt pin at logic level B.

Figure 4:
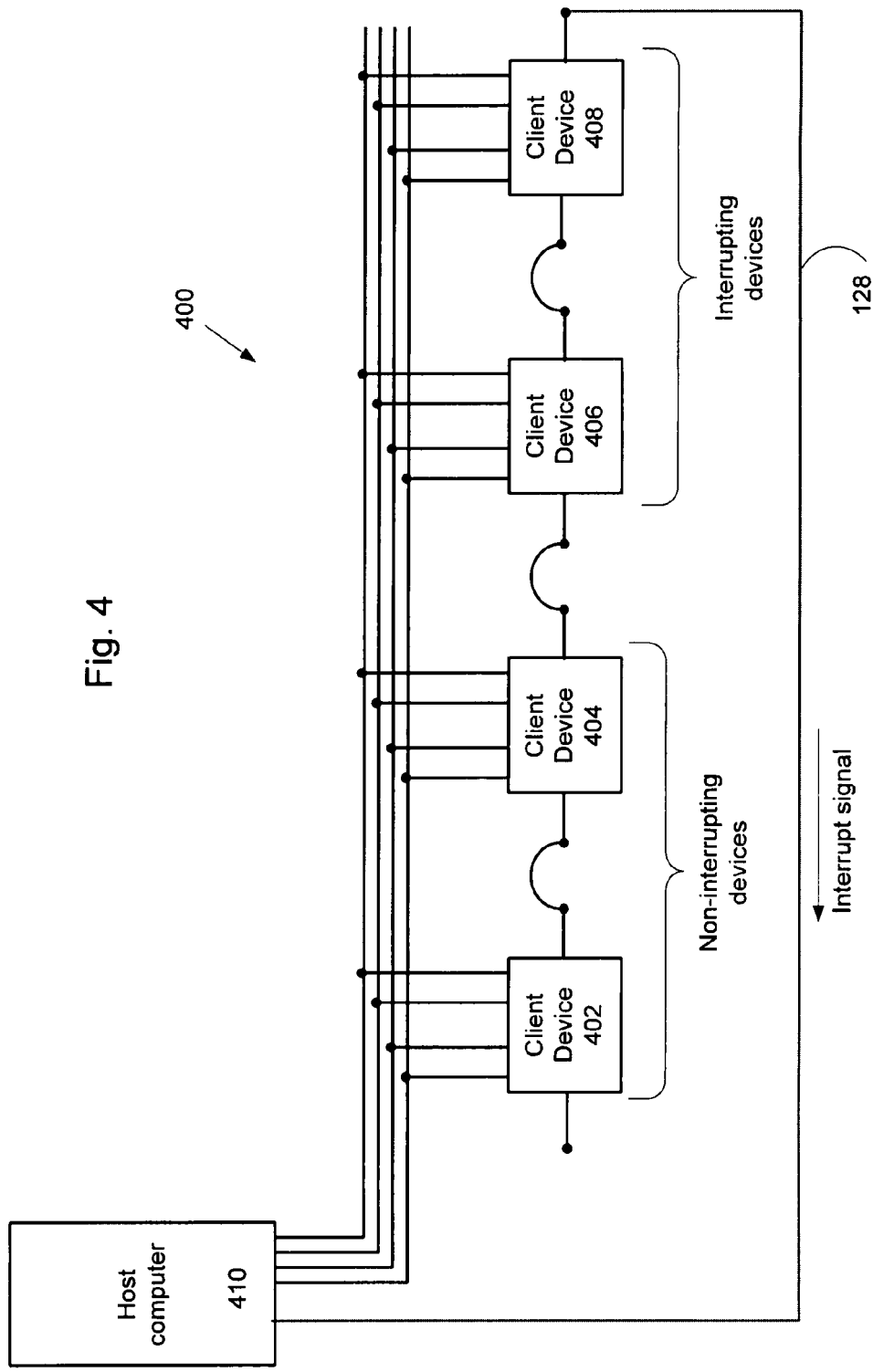
FIG. 4 shows a simplified wiring diagram of a system according to another embodiment of the present invention.

FIG. 4 shows a system 400 in accordance with another embodiment of the invention whereby a mix of non-interrupting devices 402-404 (such as an SD memory device) that do not generate interrupts and interrupting devices 406-408 (such as SDIO devices) that can generate interrupts. Since non-interrupting devices 402-404 do not generate interrupts and therefore should not be included in any search for an interrupt source, daisy chaining these devices in groups or sub-groups in known locations, these devices and be skipped in any search thereby improving search time and efficiency. For example, in the case shown in FIG. 4, non-interrupting devices 402-404 are daisy chained upstream from interrupting devices 406-408. Therefore, when host computer 410 begins a search of an interrupt source, the search can be limited to only that portion of the daisy chained client devices that can generate an interrupt, namely client devices 406-410. It should be noted that as long as the identity and location of the non-interrupting client devices are known to host computer 410, then these devices can be placed anywhere and in any combination deemed most appropriate for the application for which they are designed to be used.

Although the invention has been described using embodiments based upon a daisy chain type bus architecture, the invention is well suited for other type bus architectures. Such bus architectures include those configure to pass an interrupt from one device to another (regardless of the manner in which the interrupt is passed) and remember that an interrupt has passed through them (in order to facilitate a subsequent interrupt search, using for example, a binary search).

Figure 5:
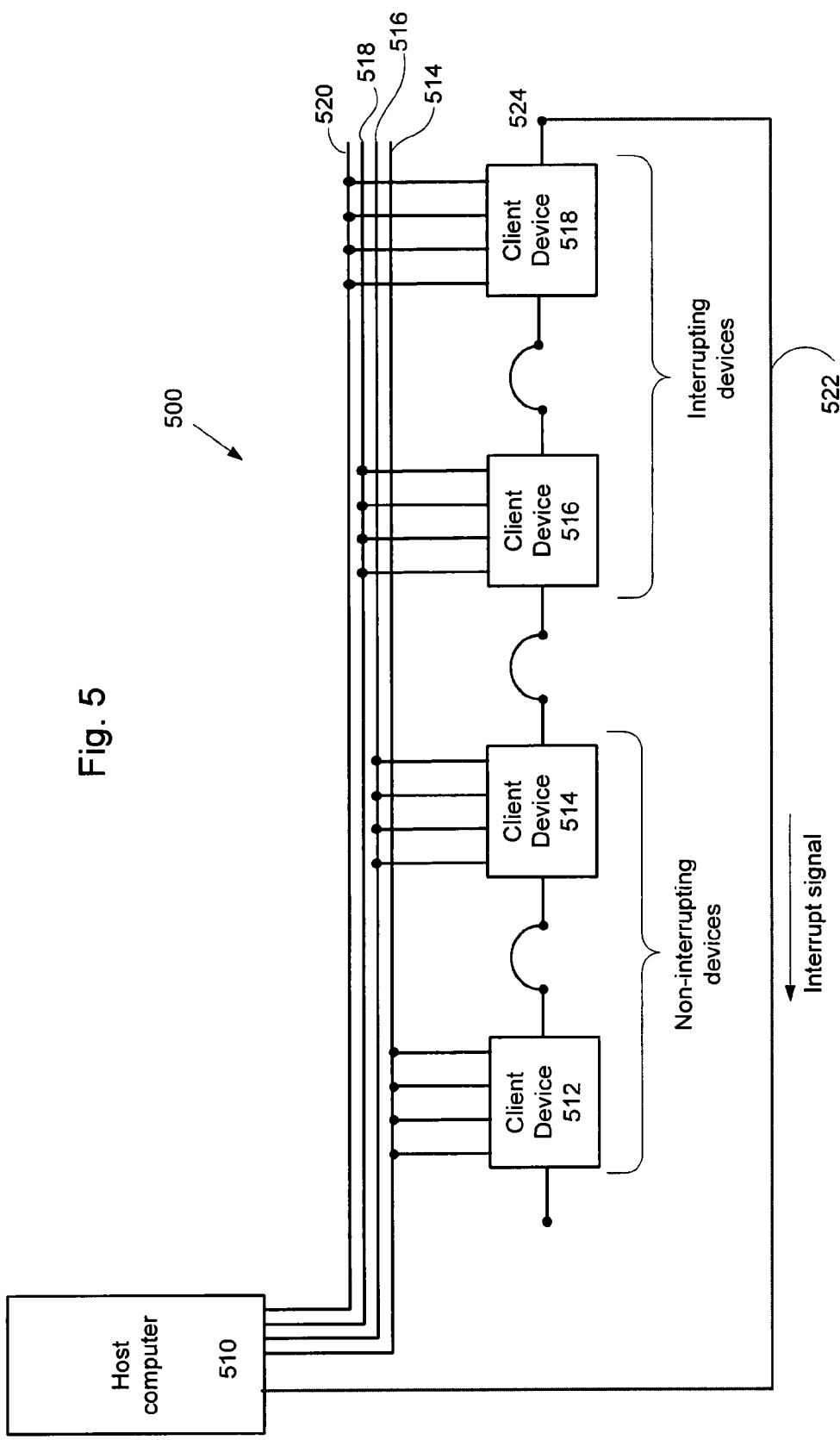
FIG. 5 illustrates a system in accordance with another embodiment of the invention where not all of the client devices share the same bus.

FIG. 5 illustrates a system 500 in accordance with another embodiment of the invention where not all of the client devices share the same bus. In particular, although each client device 502-508 are connected together in a daisy chain arrangement as described in FIGS. 1 and 4, in the system 500 each client devices 502-508 each communicate with host computer 510 via their own at least one signal line, or bus and do not therefore share a bus. For example, client device 502 is connected to bus 514, client device 504 is connected to bus 516, client device 506 is connected to bus 518, and client device 508 is connected to bus 520. In any case, an interrupt event is detected by host computer 510 by way of line 522 connected at host monitor node 524 separate from any of buses.

It should be noted that it is contemplated that the invention can be used for any type client device or any mix of types of client devices. For example, the client devices can include data storage devices, communications devices, sensing devices, and the like that can be either removable or fixed in nature. Such devices can include SDIO (Input/Output) cards used as an interface that extends the functionality of devices with SD card slots such as Bluetooth®, GPS, and WiFi (802.11b,g), etc. Data storage devices can include non-volatile memory such as Multi Media Card (MMC) and Secure Digital Card (SD). These devices can also be grouped according to whether or not they generate interrupts (SDIO devices, for example) or do not generate interrupts (SD memory devices, for example). In this way, searching for any interrupt sources can be made for efficient in both time and computing resources.

The invention can further pertain to an electronic system that includes a memory system as discussed above. Memory systems (i.e., memory cards) are commonly used to store digital data for use with various electronics products. The memory system is often removable from the electronic system so the stored digital data is portable. The memory systems according to the invention can have a relatively small form factor and be used to store digital data for electronics products that acquire data, such as cameras, hand-held or notebook computers, network cards, network appliances, set-top boxes, hand-held or other small media (e.g., audio) players/recorders (e.g., MP3 devices), and medical monitors.

The advantages of the invention are numerous. Different embodiments or implementations may yield one or more of the following advantages. One advantage of the invention is legacy devices (i.e., those devices that do not by their nature generate interrupts) can be added or removed without consideration of modifying system hardware. Another advantage of the invention is that it can be used with any host computer without any modification (for those host computers already possessing at least one general purpose I/O line (GPIO)) or only slight modification for those without at least one GPIO or interrupt therefore reducing the cost and increasing the applicability of the invention.

The many features and advantages of the invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A bus architecture for coupling a plurality of client devices with a host computer, the bus architecture suitably configured for enabling the host computer to efficiently identify which of the plurality of client devices is requesting an interrupt, the bus architecture comprising:

at least one signal line; and a plurality of client devices wherein each of the client devices includes:

a number of I/O pins selected ones of which are connected to the at least one signal line, and no more than two interrupt pins, the interrupt pins including a first and a second interrupt pin wherein all but a first and a last of the plurality of client devices are hardwired to one another in a daisy chain arrangement by way of the first and the second interrupt pin separate from the at least one signal line, wherein the first client device is hardwired to the daisy chain arrangement only by way of the second interrupt pin and wherein the first interrupt pin of the first client device is connected to a node external to the daisy chain and wherein the last client device is hardwired to the daisy chain only by way of a first interrupt pin and wherein a second interrupt pin of the last of the plurality of client devices is connected to a host computer by way of an interrupt signal line separate from the at least one signal line, wherein when a requesting client device requests an interrupt, the host computer locates the requesting device using a binary search such that at least one of the plurality of client devices is not accessed by the host device during the binary search.

2. A bus architecture as recited in claim 1, further comprising:

at least one legacy device configured to not generate an interrupt signal under any circumstances having I/O pins selected ones of which are connected to the at least one signal line and no interrupt pins.

3. A bus architecture as recited in claim 1 wherein the plurality of client devices further comprise a pending interrupt status flag and a passing interrupt status flag, wherein when at least one of the client devices requests an interrupt, the pending interrupt status of the requesting client device is changed to SET and the second interrupt pin of the requesting device is changed to a first logic level, which causes the first interrupt pin of the next downstream device to change to the first logic level, wherein when the first interrupt pin of the next downstream device changes to the first logic level, the passing interrupt status of the next downstream device is changed to SET causing the changing of the first and second interrupt pins to the first logic level through all of the downstream client devices, wherein when the second interrupt pin of the last client device is changed to the first logic level, the first logic level is sent to the host computer by way of the interrupt signal line and wherein receiving the first logic level indicates to the host computer that the interrupt has been requested.

4. A bus architecture as recited in claim 3, wherein the binary search comprises:

querying a client device located midway between the first and the last client device about the pending interrupt status and the passing interrupt status; and determining the identity of the requesting client device based upon the pending and the passing interrupt status by, (a) locating the requesting client device in an upstream portion of the daisy chain or a downstream portion of the daisy chain in relation to the queried client device;

(b) querying a second client device located midway in the upstream portion or the downstream portion located in (a); and (c) repeating (a) and (b) until all requesting client devices are identified.

5. A bus architecture as recited in claim 4, wherein if the pending interrupt status of the queried client device is SET and the passing interrupt status is NOT SET, then the queried client device is the only requesting client device.

6. A bus architecture as recited in claim 4, wherein if the pending interrupt status of the queried client device is SET and the passing interrupt status is SET, then the queried client device is one of at least another requesting client device.

7. A bus architecture as recited in claim 4, wherein if the pending interrupt status of the queried client device is $NOT_{13}$ SET and the passing interrupt status is $NOT_{13}$ SET then the requesting client device is downstream of the queried client device.

8. A bus architecture as recited in claim 4, wherein if the requesting client device is downstream, then a next queried client device is midway between the current queried client device and the last client device.

9. A bus architecture as recited in claim 4, wherein if the pending interrupt status of the queried client device is $NOT_{13}$ SET and the passing interrupt status is SET then the requesting client device is upstream of the queried client device.

10. A bus architecture as recited in claim 4, wherein if the requesting client device is upstream, then a next queried client device is midway between the current queried client device and the first client device.

11. A system, comprising:
a host computer;
at least one signal line connected to the host computer; and
a plurality of client devices wherein each of the client devices includes,
a number of I/O pins selected ones of which are connected to the at least one signal line, and
no more than two interrupt pins, the interrupt pins including a first and a second interrupt pin wherein all but a first and a last of the plurality of client devices are hardwired to one another in a daisy chain arrangement by way of the first and the second interrupt pin separate from the at least one signal line, wherein the first client device is hardwired to the daisy chain arrangement only by way of the second interrupt pin and wherein the first interrupt pin of the first client device is connected to a node external to the daisy chain and wherein the last client device is hardwired to the daisy chain only by way of a first interrupt pin and wherein a second interrupt pin of the last of the plurality of client devices is connected to the host device by way of an interrupt signal line separate from the at least one signal line, wherein when a requesting device requests an interrupt, the host computer locates the requesting device by using a binary search, such that at least one of the plurality of client devices is not accessed by the host device during the binary search of the client devices.

12. A system as recited in claim 11, further comprising:
at least one legacy device configured to not generate an interrupt signal under any circumstances having I/O pins selected ones of which are connected to the at least one signal line and no interrupt pins.

13. A system as recited in claim 11, wherein the plurality of client devices further comprise a pending interrupt flag and a passing interrupt flag, wherein when a requesting device requests an interrupt the pending interrupt status of the requesting client device is changed to SET and the second interrupt pin of the requesting device is changed to a first logic level, which causes the first interrupt pin of the next downstream device to change to the first logic level, wherein when the first interrupt pin of the next downstream device changes to the first logic level, the passing interrupt status of the next downstream device is changed to SET causing the changing of the first and second interrupt pins to the first logic level through all of the downstream client devices, wherein when the second interrupt pin of the last client device is changed to the first logic level, the first logic level is sent to the host computer by way of the interrupt signal line and wherein receiving the first logic level indicates to the host computer that the interrupt has been requested.

14. A system as recited in claim 13, wherein the binary search comprises:
querying a client device located midway between the first and the last client device about a pending interrupt status and a passing interrupt status; and
determining the identity of the requesting client device based upon the pending and the passing interrupt status by,
(a) locating the requesting client device in an upstream portion of the daisy chain or a downstream portion of the daisy chain in relation to the queried client device;
(b) querying a second client device located midway in the upstream portion or the downstream portion located in (a); and
(c) repeating (a) and (b) until all requesting client devices are identified.

15. A bus architecture, comprising:
a plurality of independent signal lines; and
a plurality of client devices having a pending interrupt flag, a passing interrupt flag and a number of I/O pins, and no more than two interrupt pins, the interrupt pins including a first and a second interrupt pin wherein all but a first and a last of the plurality of client devices are hardwired to one another in a daisy chain arrangement by way of the first and the second interrupt pin separate from the plurality of signal lines, wherein the first client device is hardwired to the daisy chain arrangement only by way of the second interrupt pin and wherein the first interrupt pin of the first client device is connected to a node external to the daisy chain and wherein the last client device is hardwired to the daisy chain only by way of a first interrupt pin and wherein a second interrupt pin of the last of the plurality of client devices is connected to an host computer by way of an interrupt signal line separate from the plurality of independent signal lines, wherein when a requesting device requests an interrupt the pending interrupt status of the requesting device is changed to SET and the second interrupt pin of the requesting device is changed to a first logic level, which causes the first interrupt pin of the next downstream device to change to the first logic level, wherein when the first interrupt pin of the next downstream device changes to the first logic level, the passing interrupt status of the next downstream device is changed to SET causing the changing of the first and second interrupt pins to the first logic level through all of the downstream client devices, wherein when the second interrupt pin of the last client device is changed to the first logic level, the first logic level is sent to the host computer by way of the interrupt signal line and wherein when the host computer receives the first logic level, the host computer locates the requesting device by way of a binary search using the pending interrupt flag and the passing interrupt flag, such that at least one of the plurality of client devices is not accessed by the host device during the binary search of the client devices.

16. A bus architecture as recited in claim 15, wherein none of the plurality of client devices share any of the plurality of independent signal lines with any other of the plurality of client devices.

17. A bus architecture as recited in claim 15, wherein at least two of the plurality of client devices share at least one of the plurality of independent signal lines.

18. A method performed by a host device for efficiently identifying an interrupt request from a plurality of client devices, the method comprising:
   receiving an interrupt request from one of the plurality of client devices;
   searching for the interrupt requesting device by:
      querying a selected one of the plurality of client devices, wherein the queried client device is not a first one and not a last one of the plurality of client devices;
      determining if the interrupt requesting device is between the host device and the queried client device if the queried device is determined to not be the interrupt requesting device; and
      if it is determined that the interrupt requesting device is between the host device and the queried device, then querying only those of the plurality of client devices between the queried client device and the host device for the interrupt requesting device, otherwise querying only those of the plurality of client devices between the queried client device and the last one of the plurality of client devices for the interrupt requesting device.

19. The method of claim 18, wherein each of the plurality of client devices comprise:
   a pending interrupt flag, which when set for a pending client device indicates that the pending client device has requested an interrupt;
   a passing interrupt flag, which when set for a passing client device indicates that the interrupt requesting device is between the passing client device and the host device,
   wherein the determining if the queried device is the interrupt requesting device and the determining if the interrupt requesting device is between the host device and the queried device is performed using the pending interrupt flag and the passing interrupt flag of the queried client device.

* * * * *